(12) United States Patent
Avidano et al.

(10) Patent No.: US 6,384,494 B1
(45) Date of Patent: May 7, 2002

(54) MOTOR-DRIVEN FAN, PARTICULARLY FOR A MOTOR VEHICLE HEAT EXCHANGER

(75) Inventors: Maurizio Avidano, Nichelino; Virgilio Crestani, Asti, both of (IT)

(73) Assignee: Gate S.p.A., Turin (IT)

( * ) Notice: Subject to any disclaimer, the term of this patent is extended or adjusted under 35 U.S.C. 154(b) by 0 days.

(21) Appl. No.: 09/564,571

(22) Filed: May 5, 2000

(30) Foreign Application Priority Data

May 7, 1999 (IT) .......................................... TO99A0375

(51) Int. Cl.[7] .............................. H02K 9/06; H02K 9/00
(52) U.S. Cl. ............................. 310/58; 310/59; 310/62; 417/423.8
(58) Field of Search .............................. 310/52, 58, 59, 310/60 R, 61, 62, 63, 60 A, 67 R; 417/423.8, 354, 368, 369

(56) References Cited

U.S. PATENT DOCUMENTS

| | | | | |
|---|---|---|---|---|
| 3,303,995 A | * | 2/1967 | Boeckel ...................... | 230/117 |
| 3,819,294 A | * | 6/1974 | Honnold et al. ............... | 416/93 |
| 4,210,833 A | * | 7/1980 | Neveux ........................ | 310/58 |
| 4,210,835 A | * | 7/1980 | Neveux ........................ | 310/62 |
| 4,554,472 A | * | 11/1985 | Kumatani ..................... | 310/62 |
| 4,883,982 A | * | 11/1989 | Forbes et al. ................. | 310/62 |
| 5,217,353 A | * | 6/1993 | De Filippis ................. | 417/368 |
| 5,944,497 A | * | 8/1999 | Kershaw et al. ......... | 417/423.8 |
| 6,031,306 A | * | 2/2000 | Permuy .................... | 310/67 R |

* cited by examiner

*Primary Examiner*—Nestor Ramirez
*Assistant Examiner*—Dang Dinh Le
(74) *Attorney, Agent, or Firm*—Sughrue Mion, PLLC

(57) ABSTRACT

A motor-driven fan includes an electric motor including a rotor and a stator in which the rotor includes an essentially cup-shaped cap which extends at least partly around the stator and has a plurality of lateral exit openings adjacent the bottom wall, and an impeller or fan including a hollow hub from which extends a plurality of main outer fan blades. This hub has a front wall fixed to the back wall of the cap of the rotor and a lateral skirt which surrounds the lateral wall of the cap in a radially spaced relationship. The hub is further provided with inner ventilation blades acting in operation to generate a cooling air stream which passes through the motor.

14 Claims, 4 Drawing Sheets

MOTOR-DRIVEN FAN, PARTICULARLY FOR A MOTOR VEHICLE HEAT EXCHANGER

BACKGROUND OF THE INVENTION

The present invention relates to a motor-driven fan, in particular for a motor vehicle heat exchanger, such as a radiator.

SUMMARY OF THE INVENTION

The object of the invention is to provide a improved motor-driven fan in which, moreover, an effective ventilation of the electric drive motor, as well as cooling of the piloting and control circuits associated with this motor is achieved.

BRIEF DESCRIPTION OF THE DRAWINGS

Further characteristics and advantages of the invention will become apparent from the following detailed description, given purely by way of non-limitative example, with reference to the attached drawings, in which.

DETAILED DESCRIPTION OF THE INVENTION

Figure 1:
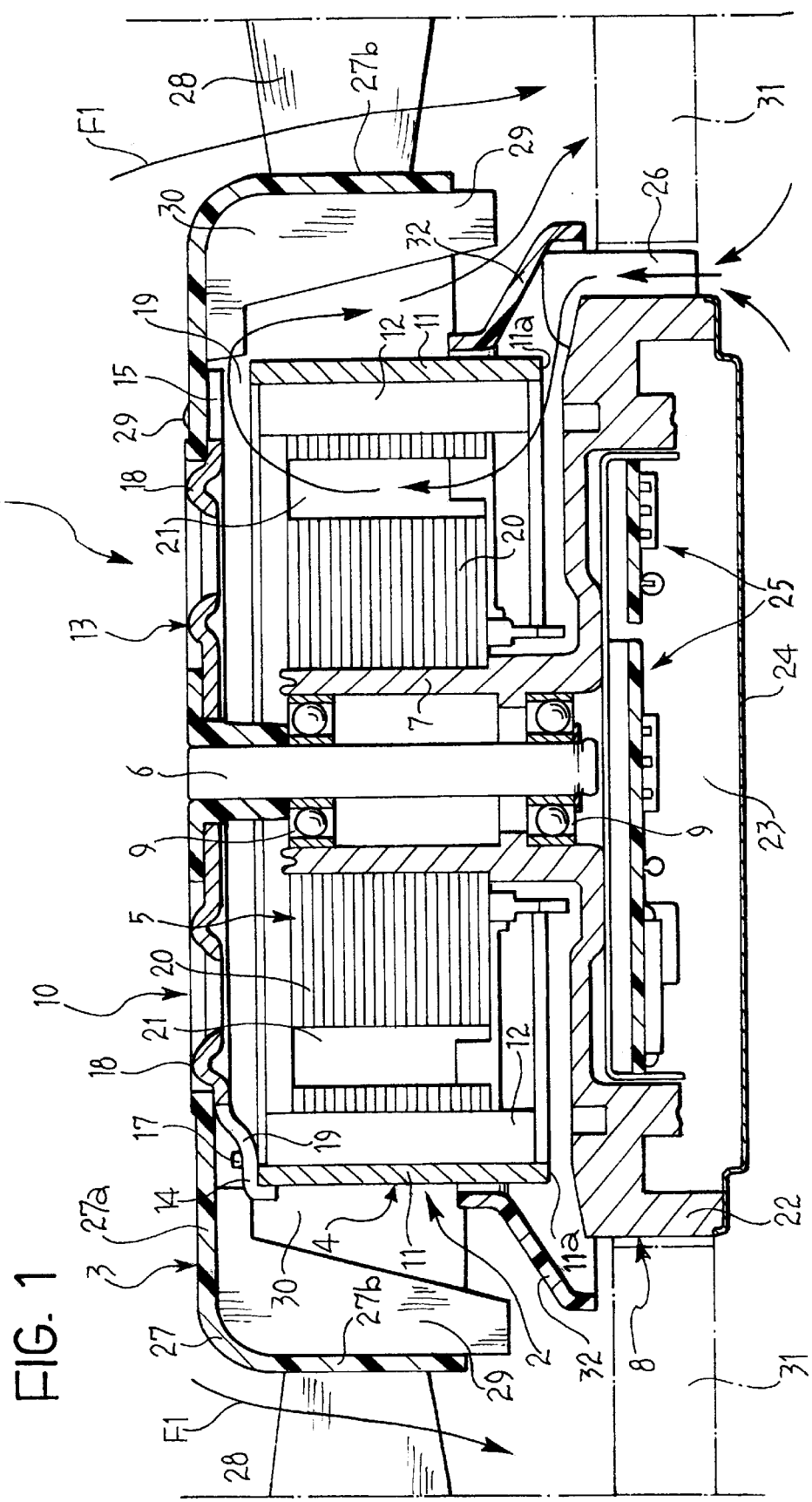
FIG. 1 is a partial axial sectional view of a motor-driven fan according to the invention.

With reference to FIG. 1, a motor-driven fan 1 according to the invention comprises a DC electric motor 2, in particular of the brushless type, and an impeller or fan 3 coupled to this motor.

In a manner known per se the electric motor 2 comprises a rotor 4 and a stator 5.

In the illustrated embodiment the rotor 4 comprises a shaft 6 supported rotatably in a tubular section 7 of a stator body 8 by means of bearings 9.

At one end of the shaft 6 is fixed a cap, generally indicated 10, having an essentially cup-shape form. In the embodiment illustrated this cap 10 comprises a cylindrical or annular wall 11 coaxial with the shaft 6, to the inner surface of which are fixed permanent magnets 12. The cap 10 further includes an end element 13, essentially in the form of a apertured disc (see also FIG. 2). The element 13 of the cap has a plurality of quasi-radial peripheral projections 14 alternating, in angularly spaced relation with other radial projections indicated 15.

The projections 14 of the element 13 of the cap are shaped and have respective apertures 16 (FIG. 2) through which extend projections 17 which protrude from the corresponding edge of the ring 11 and are pressed over the projections 14 in order stably to anchor the element 13 to the ring 11 of the cap.

The projections 14 and 15 of the element 13 of the cap extend from a main ring 18 of this element which is axially spaced from the corresponding edge of the ring 11 of the cap. Between pairs of successive or adjacent projections 14 of the element 13 of the cap there are thus defined lateral apertures 19 which face, or rather, open radially outwardly of the cap 10.

The cap 10 is made in two parts 11 and 13 as described above, and can be easily produced. However, as specialists will appreciate, this cap may possibility be made in one piece, nevertheless with apertures which extend at least partly into its lateral wall adjacent the bottom wall, like the apertures 19 described above.

The stator 5 of the electric motor 2 comprises a stack of laminations 20 (FIG. 1) fixed within the tubular projection 7 of the stator body 8, within and in facing relation to the permanent magnets 12 carried by the cap 10 of the rotor. In the stack of laminations 20 are formed cavities 21 within which there are stator windings in a manner known per se. These windings are not illustrated in FIG. 1 to keep the drawing simple. The shape and arrangement of such windings is, however, conventional, and their omission from the illustration does not prejudice the understanding of the invention.

The stator body 8 has a radially widened portion 22 formed in one piece with the tubular projection 7 and disposed on the opposite side of the cap 10. In the portion 22 of the stator body 8 there is formed a receptacle 23, preferably closed by a cover 24. In the receptacle 23 are housed circuits 25 of type known per se for piloting and control of the electric motor 2.

Figure 2:
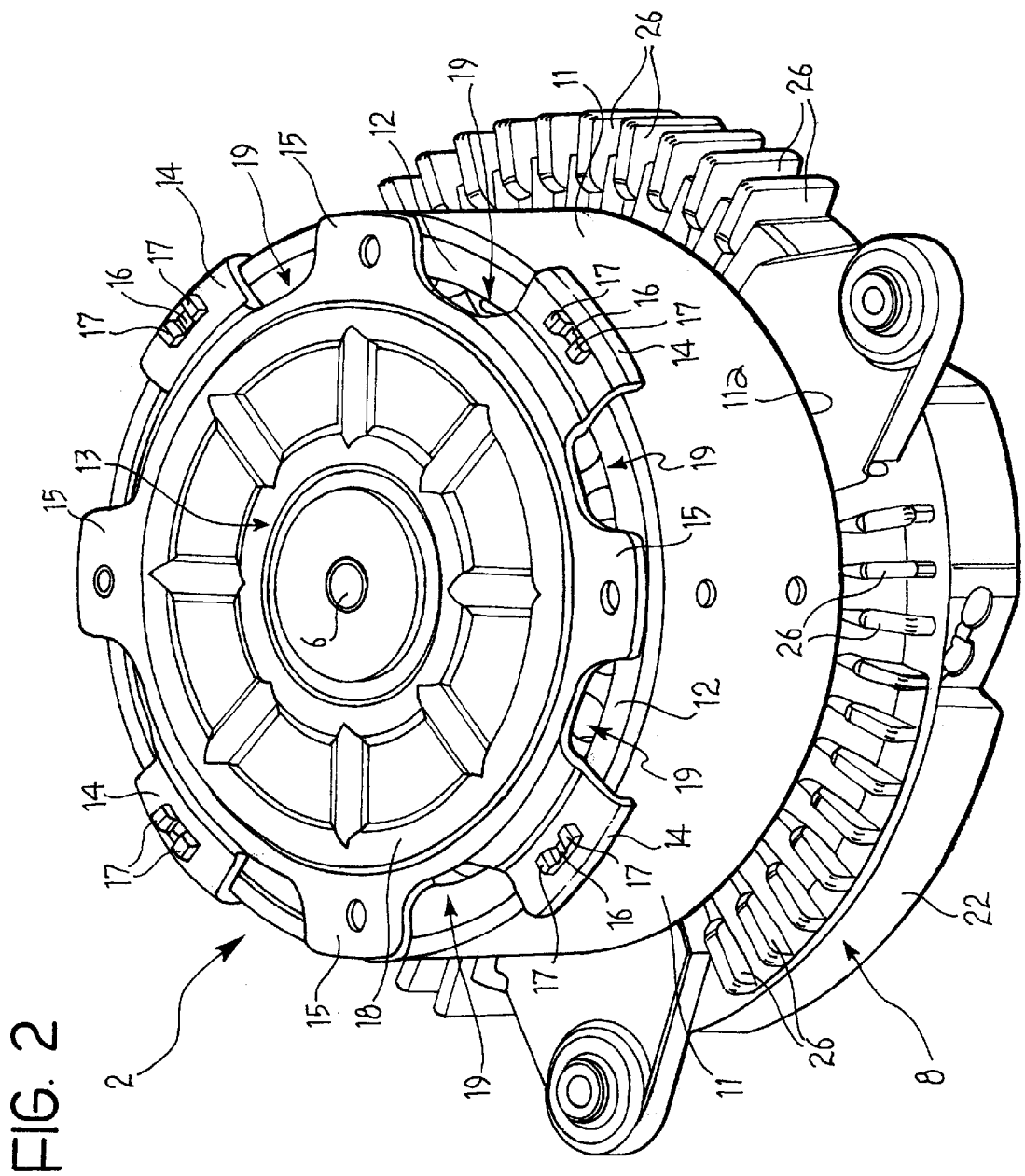
FIG. 2 is a perspective view of the electric drive motor of the motor-driven fan shown in FIG. 1.

The stator body 8 is made of metal and functions at the same time as a heat sink for heat developed in operation by the circuit 25. To this end, as will be better seen in FIG. 2, the portion 22 of the stator body 8 is provided externally with a plurality of peripheral, essentially radial cooling fins 26 which extend close to the free edge 11a of the cylindrical ring 11 of the cap 10 of the rotor. As is seen in FIGS. 1 and 2, portion 22 of the stator body 8 preferably, but not necessarily, has a greater diameter than that of the ring or side wall 11 of the cap 10.

The fan or rotor 3 of the motor-driven fan comprises a hollow hub 27 (FIG. 1) from which extends a plurality of main outer fan blades 28. The hub 27 has a front wall 27a fixed to the radial projections 15 of the disc element 13 of the cap 10, by means of rivets 29 or the like (FIG. 1). The hub 27 of the fan 3 further has a lateral, essentially cylindrical, skirt 27b which surrounds the side wall or ring 11 of the cap 10 in a radially spaced relation thereto.

As is seen in FIG. 1, the hub 27 of the fan 3 is further provided, in the space 30 defined between the ring 11 of the cap 10 and the skirt 27b of the hub of the fan with internal fan blades 29 which extend in respective inclined planes with respect to the radial direction.

In a manner known per se, the body 8 of the stator of the motor 2 of the motor-driven fan is intended to be fixed to a support structure, only partially illustrated (in broken outline) in FIG. 1, where it is indicated with the reference numeral 31.

Conveniently, although not necessarily, the motor-driven fan 1 further includes a separator ring 32 (FIG. 1) of essentially conical form, disposed around the end of the cylindrical wall 11 of the cap 10 facing the stator body 8 as well as around the ends of the cooling fins 26 of this stator body facing the fan. The separator ring 32 the function of which will be described hereinafter, can be fixed to the stator body 8 in various known ways.

In operation the electric motor 2 of the motor-driven fan 1 is activated and causes rotation of the fan 3 fixed to the rotor 4. The fan 3 produces a main flow of cooling air by means of its outer blades 28 as indicated by the arrows F1 in FIG. 1. At the same time the internal blades 29 within the hub 27 of the fan cause a flow of cooling air through the electric motor 2 along a path indicated with a plurality of arrows in the right hand part of FIG. 1. As shown by these arrows, the air stream caused by the inner blades 29 flows over the periphery of the portion 22 of the stator body 8 and its cooling fins 26, then penetrates into the electric motor 4 through the circumferential interstices defined between the stator body 8 and the edge 11a of the annular wall 11 of the cap 10 of the rotor. Within the electric motor 4 the air stream traverses a series of longitudinal passages constituted by the interstices between the conductors of the stators disposed in the cavities 21 of the stack of laminations 20 as well as the air gap defined between the stator and the rotor. For a better ventilation efficiency further longitudinal passages (not illustrated in the drawings) can be provided in the stack of laminations 20. The air stream then flows close to the end element 13 of the cap 10 and exits from the electric motor 4 through the lateral apertures 19 defined in this cap, through the gap 30 between the cap and the hub 27 of the fan 3. This air stream discharges out by passing between the rear edge of the skirt 27b of the hub 27 of the fan and the annular separator element 32. This latter acts to impede mixing of the air stream entering the electric motor 4 with the air stream leaving it, as well as impeding the ingress of extraneous bodies or atmospheric agents into the electric motor.

The above-described path of the ventilation air within the electric motor 2 is optimal in that this air flows first over the stator body 8, 22 and carries away the low temperature heat generated by the piloting and control circuits 25 associated with the motor. This air then penetrates into the electric motor 2 and cools the stator, carrying away from it heat at a relatively higher temperature. Fixing the hub 27 of the fan 3 directly to the cap 10 of the rotor, rendered possible by the aperture 19 formed laterally in this cap, allows a considerable reduction in the overall axial dimensions of the motor-driven fan.

Figure 3:
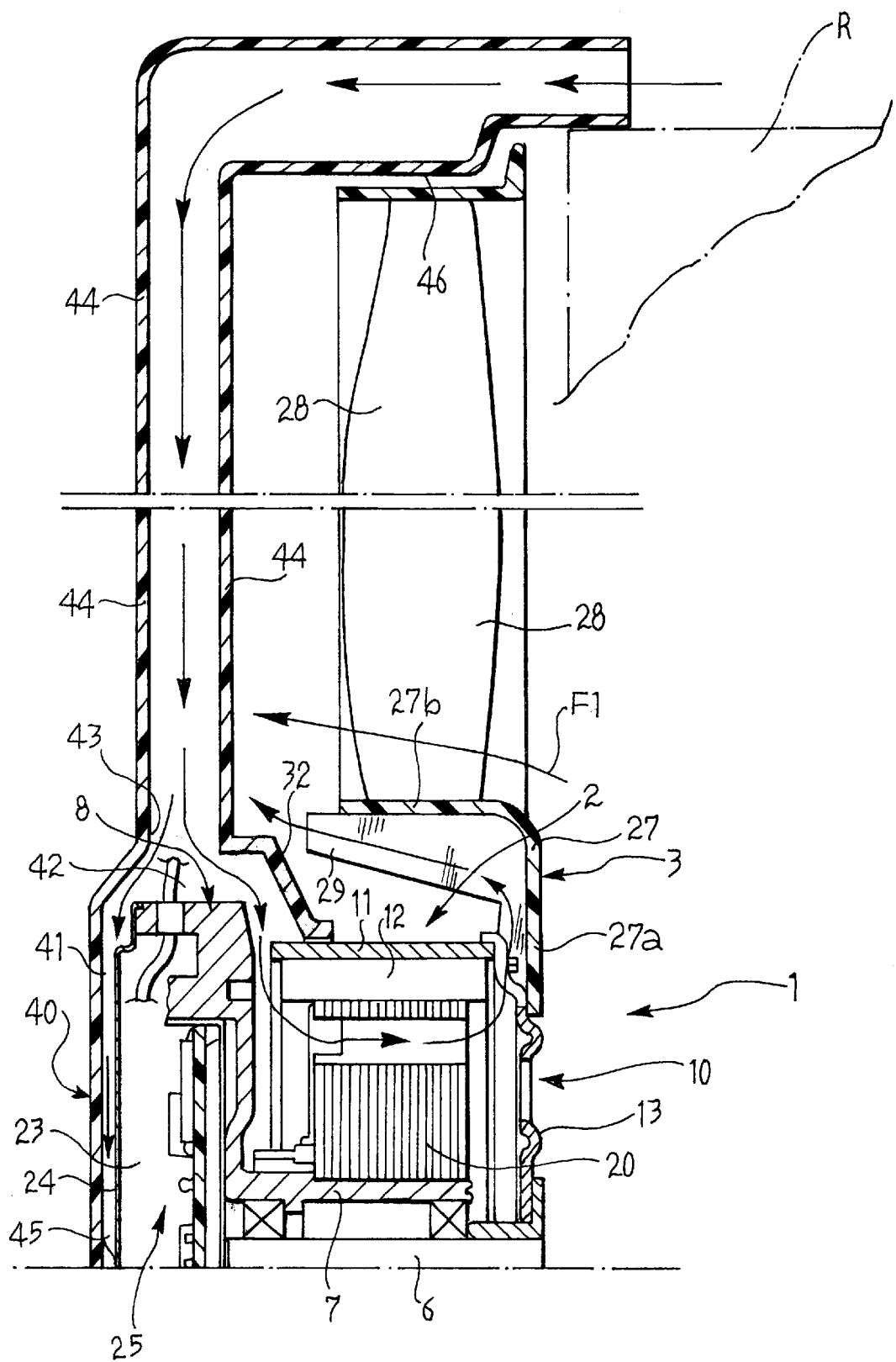
FIG. 3 is a partial representation in axial section, of an alternative embodiment of the motor-driven fan according to the invention.

In FIG. 3 there is shown an alternative embodiment of a motor-driven fan according to the invention. In this figure the parts and elements already described have again been allocated the same reference numerals as those utilised above.

In the embodiment of FIG. 3 a rear body 40 is fixed to the stator body 8 on the side opposite the fan 3, which extends in facing and spaced relationship with respect to the cover 24 and which surrounds the periphery of the stator body 8 lying close the annular separator element 32.

The rear body 40 defines, with respect to the stator 8, 24, a rear air gap 41 and an annular lateral air gap 42 intercommunicating with one another.

The body 40 has at least one aperture 43 for the ingress of the air stream generated by the inner blades 29 of the fan.

The portion of the rear body 40 facing the cover 24 of the stator is conveniently provided with at least one projection 45 in contact with this cover for the purpose of reducing or cancelling the effects of vibration.

The inlet aperture 43 of the rear body 40 is conveniently connected to an aspiration duct 44 which draws in air from a region situated radially outwardly of the fan 3.

The rear body 40 may advantageously be formed integrally with a support structure to which the motor-driven fan 1 is fixed and defining a passage 46 for conveying the air stream caused in operation by the main blades 28 of the fan. In this case the aspiration duct 44 can be formed at least partly in a spoke of this support and conveying structure. In the case of a motor-driven fan associated with a radiator R the inlet aperture of the aspiration duct 44 is conveniently situated outside the boundary of this radiator R.

Finally, as shown in FIG. 3, the aspiration duct 44 may advantageously be utilised for the passage of electrical conductors connected to the piloting and control circuits 25 of the electric motor 2.

Figure 4:
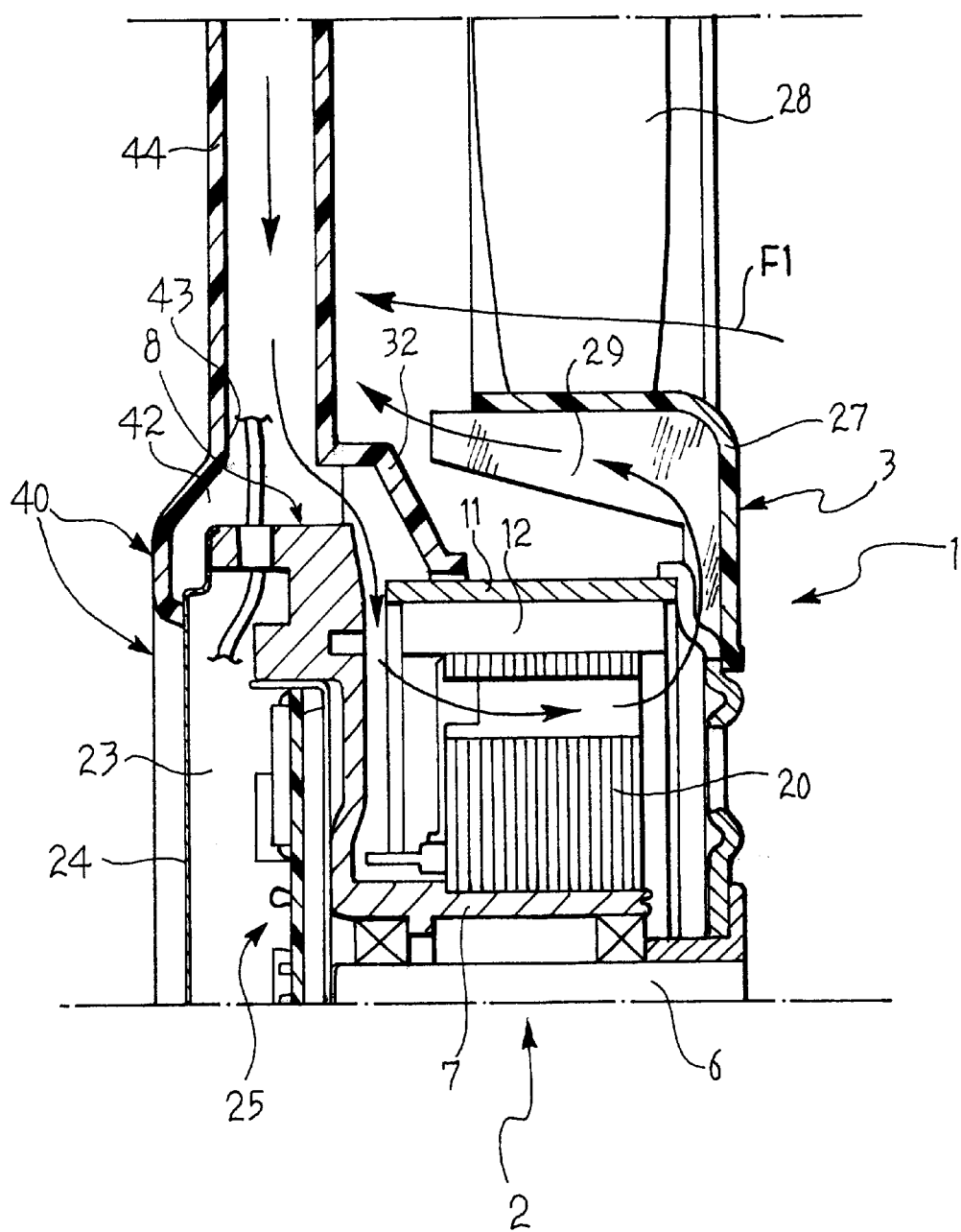
FIG. 4 is a partial axial sectional representation of another alternative embodiment.

In FIG. 4 there is shown an alternative embodiment in which the rear body 40 has an essentially annular shape and defines, with respect to the stator body 8 and the cover 24, only one circumferential annular chamber 42 adjacent the separator ring 32.

Naturally, the principle of the invention remaining the same, the embodiments and the details of construction can be widely varied with respect to what has been described and illustrated purely be way of non-limitative example, without by this departing from the ambit of the invention as defined in the attached claims.

What is claimed is:

1. A motor-driven fan particularly for a motor vehicle heat exchanger, comprising a brushless DC electric motor including a rotor and a stator in which the rotor includes a cup-shaped cap with a bottom wall and a cylindrical side wall which extends at least partly around the stator and has a plurality of lateral outflow apertures between said side wall and said bottom wall, said bottom wall having an inner surface and an outer surface, and an impeller or fan including a hollow hub from which extends a plurality of main outer fan blades; the hub having a front wall fixed to the outer surface of the bottom wall of the cap of the rotor and a lateral skirt which surrounds the side wall of said cap in a radially spaced relationship therewith; the hub being further provided with inner ventilation blades acting in operation to generate a flow of cooling air through the motor along a path which extends from one end of the motor opposite the hub of the fan through the stator and towards the bottom wall of the cap within the motor, radially outwardly along the inner surface of the bottom wall of said cap and then through the lateral outflow apertures of the cap of the rotor and into an interspace defined between said cap and the skirt of the hub of the fan and ending outwardly of said hub in a region downstream of the main outer fan blades.

2. A motor-driven fan according to claim 1, in which an ingress opening for cooling air drawn into the motor is constituted by an annular space defined between a rear edge of said cap of the rotor and the periphery of the stator body.

3. A motor-driven fan according to claim 1, in which the stator comprises a stack of laminations in which are formed cavities within which are located stator windings; said stack of laminations being fixed to a stationary support structure in an end of which opposite the fan is formed a receptacle in which are housed piloting and control circuits of the motor; said support structure having a plurality of peripheral outer, essentially radial, cooling fins close to the rear edge of the side wall of the cap of the rotor; whereby, in operation the inner blades of the hub of the fan are able to generate a cooling air stream within the motor which flows over the cooling fins before entering into the cavities of the stator.

4. A motor-driven fan according to claim 3, in which said receptacle has a closure cover of a material which is a good conductor of heat.

5. A motor-driven fan according to claim 1, in which between the cap and the skirt of the hub of the fan there are interposed separator rings actin to impede mixing of the air stream entering the motor with the air stream exiting therefrom, and to impede ingress of extraneous bodies or atmospheric agents into the motor.

6. A motor-driven fan according to claim 5, in which said separator ring is formed integrally with the said rear body.

7. A motor-driven fan according to claim 5, in which the said separator ring is formed integrally with a support structure to which the motor-driven fan is fixed and defining a passage for the air stream generated in operation by the main blades of the fan.

8. A motor-driven fan according to claim 1, wherein at the end of the stator opposite the fan there is fixed, in spaced and facing relationship, a rear body defining, with respect to the stator, at least one annular chamber for the passage of an air stream generated in operation within the motor; the said annular chamber being provided with at least one air inlet passage in the said rear body.

9. A motor-driven fan according to claim 8, in which the said rear body extends in facing relationship with respect to the entire rear surface of the stator and defines, with respect to this, a rear air gap and a lateral annular air gap communicating with one another; said air gap being intended to be traversed by the air stream generated within the motor before entering the cap of the rotor.

10. A motor-driven fan according to claim 9, wherein the rear portion of the body facing the rear surface of the stator has at least one projection in contact with the said rear surface of the stator.

11. A motor-driven fan according to claim 8, in which the said rear body is formed integrally with a support structure to which the motor-driven fan is fixed and defining a passage for the air stream generated in operation by the main blades of the fan.

12. A motor-driven fan according to claim 8, in which the said at least one inlet passage for air drawn into the motor is constituted by an aspiration duct formed at least in part in a spoke of the said support structure.

13. A motor-driven fan according to claim 12, in which the said aspiration duct has an inlet aperture for air, positioned radially outwardly of the fan.

14. A motor-driven fan according to claim 8, in which electric conductors connected to the said piloting and control circuits of the motor extend through the said at least one air inlet passage to the rear body.

* * * * *